US010181972B1

(12) United States Patent
Giallorenzi et al.

(10) Patent No.: US 10,181,972 B1
(45) Date of Patent: Jan. 15, 2019

(54) CODE DIVISION MULTIPLE ACCESS (CDMA) MANET

(71) Applicant: L3 Technologies, Inc., New York, NY (US)

(72) Inventors: Thomas R. Giallorenzi, Sandy, UT (US); Phillip M. Hirz, Holladay, UT (US); N. Thomas Nelson, Spanish Fork, UT (US); Brent Kenney, Bountiful, UT (US); Radivoje Zarubica, Sandy, UT (US); Jason Wilden, South Jordan, UT (US)

(73) Assignee: L3 Technologies, Inc., New York, NY (US)

( * ) Notice: Subject to any disclaimer, the term of this patent is extended or adjusted under 35 U.S.C. 154(b) by 0 days.

(21) Appl. No.: 15/605,614

(22) Filed: May 25, 2017

(51) Int. Cl.
*H04L 27/227* (2006.01)
*H04J 13/00* (2011.01)
*H04L 12/815* (2013.01)
*H04W 72/04* (2009.01)
*H04L 7/04* (2006.01)
*H04W 84/18* (2009.01)
*H04J 13/16* (2011.01)

(52) U.S. Cl.
CPC .......... *H04L 27/2278* (2013.01); *H04J 13/00* (2013.01); *H04L 7/043* (2013.01); *H04L 47/225* (2013.01); *H04W 72/0453* (2013.01); *H04J 2013/165* (2013.01); *H04W 84/18* (2013.01)

(58) Field of Classification Search
CPC ... H04L 27/2278; H04L 47/225; H04L 7/043; H04L 27/3405; H04L 27/366; H04L 27/362; H04L 2025/0335; H04L 25/03006; H04L 25/03343; H04L 27/2655; H04L 5/0048; H04L 12/189; H04L 27/0008; H04L 5/0023; H04B 10/2581; H04B 10/11; H04B 10/5161; H04B 10/516; H04B 7/0413; H04B 7/0697; H04B 10/40; H04W 72/0453; H04W 84/18; H04W 72/02; H04W 72/1284; H04J 13/00; H04J 2013/165
See application file for complete search history.

(56) References Cited

U.S. PATENT DOCUMENTS

| 8,649,418 | B1* | 2/2014 | Negus | H04B 7/0486 375/211 |
| 9,485,063 | B2* | 11/2016 | Shattil | H04B 7/026 |
| 9,712,238 | B2* | 7/2017 | Ashrafi | H04B 10/2575 |

(Continued)

*Primary Examiner* — Khanh C Tran
(74) *Attorney, Agent, or Firm* — Workman Nydegger (57) ABSTRACT

Embodiments are directed to systems and methods for communicating between nodes in a mobile ad hoc network. In one scenario, a node in a mobile ad hoc network communicates with another node in the network using both code division multiple access (CDMA) and frequency division duplexing. The communication is coded prior to transmission to the other node, and includes applying direct sequence spread spectrum (DSSS) modulation to a transmission signal at a specified bit rate over a specified spectrum. The DSSS coding is applied in accordance with a processing gain which spreads the spectrum relative to the bit rate of the transmission. The coded communication is then transmitted over a specified frequency band allocated to the node over which the node transmits data and over which the other node receives the data.

17 Claims, 6 Drawing Sheets

(56) References Cited

U.S. PATENT DOCUMENTS

| | | | | |
|---|---|---|---|---|
| 9,820,280 | B2* | 11/2017 | Ellinikos | H04W 72/085 |
| 2005/0069044 | A1* | 3/2005 | Iacono | H04W 52/16 |
| | | | | 375/259 |
| 2006/0165155 | A1* | 7/2006 | Liu | H04B 1/71632 |
| | | | | 375/130 |
| 2012/0002567 | A1* | 1/2012 | Sun | H04W 28/16 |
| | | | | 370/252 |
| 2014/0248917 | A1* | 9/2014 | Scipione | H04W 72/0406 |
| | | | | 455/509 |
| 2014/0328423 | A1* | 11/2014 | Agee | H04B 7/0413 |
| | | | | 375/267 |

* cited by examiner

CODE DIVISION MULTIPLE ACCESS (CDMA) MANET

BACKGROUND

In a traditional cell phone architecture, cell towers communicate with each of the phones in their broadcast region. The cell towers determine, based on a variety of factors, which power level each cell phone should use when communicating with that cell tower. Ideally, each phone will use the minimum amount of power possible so that the various phones' signals don't interfere with each other. Indeed, if one phone is transmitting at a very high power rate in a certain area, that phone's transmission signal can cause interference with other phone's signals.

In mobile ad hoc networks, each node may be configured to use substantially the same amount of power when transmitting a signal. However, in cases where the nodes are mobile (such as cars, airplanes, or passengers with mobile phones), some nodes may be physically much closer to each other than others. In such cases, those nodes will continue to transmit data to each other at a high power level. This high power level can cause interference in the mobile ad hoc network.

Moreover, many data networks use data bursting to transmit large amounts of data in a small amount of time. When bursting data, a phone or other device uses a comparatively large amount of power to transmit data at a higher rate for a short amount of time. Data bursting, however, depletes battery power quickly, and requires a larger antenna. Battery life and hardware component space on mobile devices are already scarce commodities, and data bursting only makes the problem worse.

Traditional cell towers allow multiple devices to simultaneously transfer these data bursts using some form of multiple access technology. Code division multiple access (CDMA) is one form of multiple access. In CDMA, each device transmits on the same frequency at the same time, but each device has a separate code. The cell tower chooses which code(s) to listen to at any given time. In time division multiple access (TDMA), each device take turns transmitting data on the same frequency according to a synchronized clock, each transmitting during its specified time. Frequency division multiple access (FDMA) provides each device with its own frequency band and the device transmits and receives in that band.

BRIEF SUMMARY

Embodiments described herein are directed to systems and methods for communicating between nodes in a mobile ad hoc network. In one embodiment, a system is provided having multiple nodes in a mobile ad hoc network. One of the nodes is configured to communicate with at least one other node in the network using both code division multiple access (CDMA) and frequency division duplexing (FDD). The communication is coded prior to transmission to the other node. The coding includes applying direct sequence spread spectrum (DSSS) modulation to a transmission signal at a specified bit rate over a specified spectrum, and the DSSS coding is applied in accordance with a processing gain which spreads the spectrum relative to the bit rate of the transmission. The coded communication is then transmitted over a specified frequency band allocated to the node over which the node transmits data and over which the other node receives the data.

In another embodiment, a method is provided for communicating between nodes in a mobile ad hoc network. A first node in a mobile ad hoc network communicates with a second node in the network using both CDMA and FDD. The first node codes the communication prior to transmission to the second node. The coding includes applying DSSS modulation to a transmission signal at a specified bit rate over a specified spectrum. The DSSS coding is applied in accordance with a processing gain which spreads the spectrum relative to the bit rate of the transmission. The method then includes transmitting the coded communication over a specified frequency band allocated to the first node using FDD, over which the first node transmits data and over which the second node receives the data.

In another embodiment, a method for communicating between nodes in an ad hoc mobile network is described using CDMA, FDD and time division multiplexing (TDM). The method includes determining that portions of data are to be part of a communication sent from a first node to a second node using CDMA, FDD, and TDM. Based on the determination, the first node codes the communication prior to transmission to the second node. The coding includes applying DSSS modulation to a transmission signal at a specified bit rate over a specified spectrum. The DSSS code is applied in accordance with a processing gain which spreads the spectrum relative to the bit rate of the transmission.

The first node then transmits the communication using TDM over a specified frequency band allocated to the first node over which the first node transmits data and over which the second node receives the data and over which a third node receives the data. These methods and systems allow low power, continuous transmission that allows for imbalance in transmission power among the nodes (e.g. when processing gains are on the order of 1000× to 10000×).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to systems and methods for communicating between nodes in a mobile ad hoc network. In one embodiment, a system is provided having multiple nodes in a mobile ad hoc network. One of the nodes is configured to communicate with at least one other node in the network using both code division multiple access (CDMA) and frequency division duplexing (FDD). The communication is coded prior to transmission to the other node. The coding includes applying DSSS modulation to a transmission signal at a specified bit rate over a specified spectrum, and the DSSS coding is applied in accordance with a processing gain which spreads the spectrum relative to the bit rate of the transmission. The coded communication is then transmitted over a specified frequency band allocated to the node over which the node transmits data and over which the other node receives the data.

In another embodiment, a method is provided for communicating between nodes in a mobile ad hoc network. A first node in a mobile ad hoc network communicates with a second node in the network using both CDMA and FDD. The first node codes the communication prior to transmission to the second node. The coding includes applying DSSS modulation to a transmission signal at a specified bit rate over a specified spectrum. The DSSS coding is applied in accordance with a processing gain which spreads the spectrum relative to the bit rate of the transmission. The method then includes transmitting the coded communication over a specified frequency band allocated to the first node using FDD, over which the first node transmits data and over which the second node receives the data.

In another embodiment, a method for communicating between nodes in an ad hoc mobile network is described using CDMA, FDD and time division multiplexing (TDM). The method includes determining that portions of data are to be part of a communication sent from a first node to a second node using CDMA, FDD, and TDM. Based on the determination, the first node codes the communication prior to transmission to the second node. The coding includes applying DSSS modulation to a transmission signal at a specified bit rate over a specified spectrum. The DSSS code is applied in accordance with a processing gain which spreads the spectrum relative to the bit rate of the transmission. The first node then transmits the communication using TDM over a specified frequency band allocated to the first node over which the first node transmits data and over which the second node receives the data and over which a third node receives the data.

Embodiments described herein may be implemented by various types of computing systems. These computing systems are now increasingly taking a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems (e.g. a cloud computing environment). In a cloud computing environment, program modules may be located in both local and remote memory storage devices.

As described herein, a computing system may also contain communication channels that allow the computing system to communicate with other message processors over a wired or wireless network. Such communication channels may include hardware-based receivers, transmitters or transceivers, which are configured to receive data, transmit data or perform both. Embodiments described herein also include physical computer-readable media for carrying or storing computer-executable instructions and/or data structures. Such computer-readable media can be any available physical media that can be accessed by a general-purpose or special-purpose computing system.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
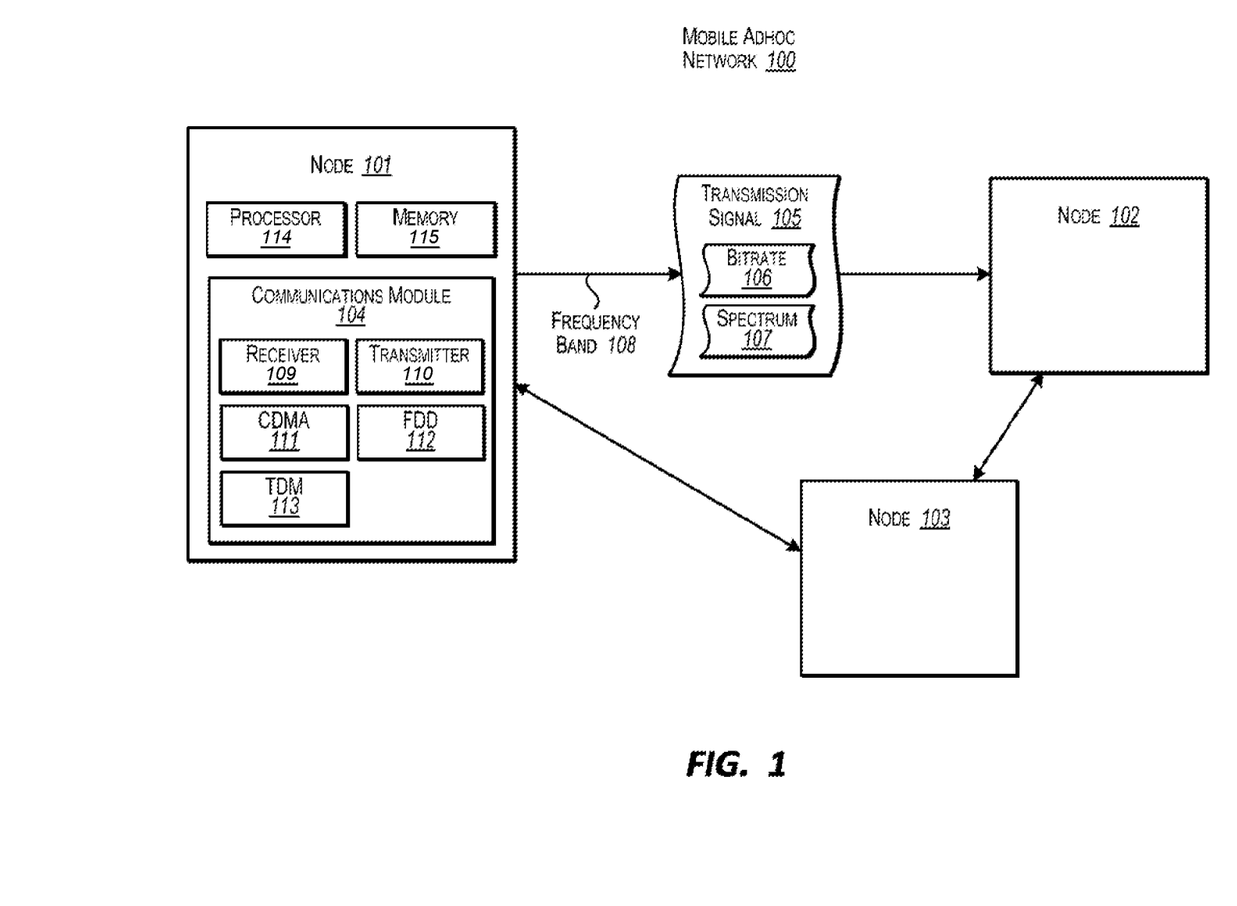
FIG. 1 illustrates a network architecture in which embodiments described herein may operate including communicating between nodes in a mobile ad hoc network.

Referring to the figures, FIG. 1 illustrates a network architecture of a mobile ad hoc network 100 in which at least one embodiment described herein may be employed. The mobile ad hoc network 100 includes multiple different nodes. These nodes may be stationary or mobile relative to each other. Although three nodes are shown in FIG. 1, it will be understood that substantially any number of nodes may be included in the mobile ad hoc network 100. Each node may include some type of processing means such as a processor 114, microprocessor, programmable logic device (PLC) or other computer hardware or firmware capable of executing software code. The nodes also have some amount of physical memory 115, as well as a communications module 104.

The communications module 104 may be configured to communicate with other nodes in the mobile ad hoc network 100. The communications module 104 may include any wired or wireless communication means that can receive and/or transmit data to or from other computer systems. For example, the communications module 104 may include a hardware receiver 109, a hardware transmitter 110, a transceiver or other type of communication hardware. The communication hardware may comprise, for example, a radio such as a cellular radio, a Bluetooth radio, a global positioning system (GPS) radio or other type of radio that can implement DSSS modulation. The communications module 104 may be configured to interact with databases, mobile computing devices (such as mobile phones or tablets), embedded or other types of systems or nodes. Each node in the mobile ad hoc network 100 may be configured similarly (i.e. with similar hardware and/or software), or may be configured with different hardware or software. Thus, nodes 102 and 103 may be configured the same as or different than node 101.

Node 101 may include other modules used in communications within the mobile ad hoc network 100. For example, node 101 may include a code division multiple access (CDMA) module 111. CDMA is one type of wireless network architecture in which multiple nodes send data through a common radio channel to one or many destinations without substantially interfering with each other. Other examples of multiple access wireless architectures or coding schemes include time division multiple access (TDMA), frequency division (FDMA), space division (SDMA) and collision sense (CSMA). Although CDMA is focused on herein, it will be understood that any of these multiple access coding schemes may be used in addition to or in place of CDMA in the embodiments herein.

Furthermore, node 101 may include a frequency division duplexing (FDD) module 112. Duplexing allows a node to carry out a two-way radio communication with another node, where each node uses an assigned frequency. Time division duplexing (TDD) is another method of carrying out two-way radio communication with another node, where time slots are allocated to each node and the nodes communicate within those time slots. Still further, node 101 may include a time division multiplexing (TDM) module 113. Multiplexing allows a node to send data to multiple destination nodes. Multiple packets of data may be multiplexed into a one-to-many stream of data that is broadcast to many different nodes simultaneously. Examples of this coding scheme include time division multiplexing (TDM), frequency (FDM), code (CDM), space (SDM), scale division multiplexing (i.e. hierarchical modulation), polarization division multiplexing, (PolDM), and others. Although TDM is used in many of the embodiments herein, it will be understood that substantially any multiplexing technique may be used in place of TDM.

One embodiment generally shown in FIG. 1 includes a system for communicating between nodes in a mobile ad hoc network. The system multiple nodes (101-103) in a mobile ad hoc network 100. Node 101 may be configured to communicate with nodes 102 and/or 103 (among other nodes) using both code division multiple access (CDMA) and frequency division duplexing (FDD). The CDMA module 111 may be configured to apply direct sequencing encoding scheme, prior to transmission to node 102, where the coding includes applying DSSS modulation to a transmission signal at a specified bit rate over a specified spectrum. Indeed, the DSSS encoding scheme may be applied to the transmission signal 105 at a bit rate 106 over frequency spectrum 107. The DSSS coding is applied in accordance with a processing gain which spreads the spectrum relative to the bit rate of the transmission.

Indeed, as defined herein, the processing gain is equal to the signal spread divided by the bit rate, or alternatively, the code rate divided by the bit rate. The processing gain spreads the frequency spectrum relative to the bit rate 106 at which the transmission 105 is sent. The spreading caused by the processing gain allows more signals to arrive at about the same time at a given node, and reduces interference among the signals. The coded transmission signal 105 is transmitted over a specified frequency band 108 allocated to node 101 over which node 101 transmits data and over which node 102 receives the data. The frequency band 108 is allocated to node 101 using frequency division duplexing. In frequency division duplexing, multiple nodes can communicate with each other at the same time using different frequency bands or frequency spectra. Thus, in this manner, a node may communicate with other nodes in the mobile ad hoc network 100 using a combination of CDMA and FDD.

In some embodiments, node 101 in the mobile ad hoc network may additionally implement time division multiplexing (TDM) when transmitting the communication. Thus, node 101 may use TDM module 113 to apply time division multiplexing when transmitting the transmission signal 105 to nodes 102 and 103. The combination of multiple access, duplexing, and multiplexing leads allows for continuous transmissions between nodes (as opposed to burst transmissions). Continuous transmissions provide better range, faster data rate, improved battery life and lower terminal size, reduced weight and less power consumption, as opposed to bursted transmission schemes. Accordingly, the nodes described herein, when implementing CDMA, FDD and/or TDM in a mobile ad hoc network, can transmit in a continuous manner, reducing power consumption and providing a better range and data rate. Indeed, since the nodes do not have to burst in time, but rather transmit continuously, the link data rate can be lower. This reduces power and provides better range in cases where the user data rate is equal between CDMA and FDD.

Figure 2:
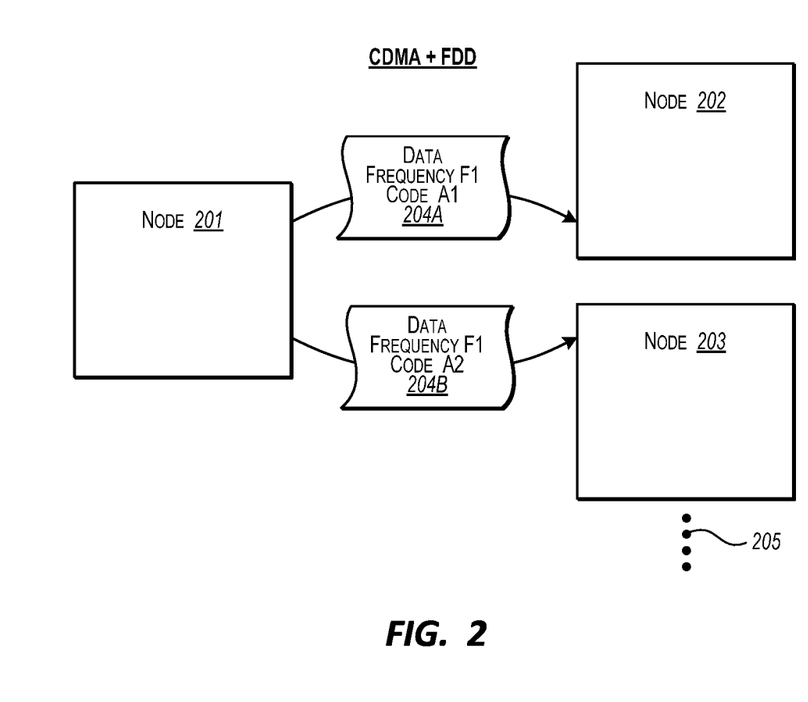
FIG. 2 illustrates an embodiment in which nodes in a mobile ad hoc network communicate using CDMA and FDD.

In FIG. 2, CDMA and FDD are used simultaneously within the mobile ad hoc network to transmit a communication from node 201 to nodes 202 and 203. CDMA provides a direct sequence, spread spectrum encoding where each of the nodes (e.g. 201, 202 and 203) communicates on the same frequency at the same time using its own separate code. Thus, each node listens for that code and ignores signals that have other codes. FDD provides each node with its own frequency band, and each node can then transmit and receive in that frequency band. Accordingly, in the scenario shown in FIG. 2, where node 201 is transmitting messages 204A and 204B to nodes 202 and 203, respectively, node 201 will transmit using code A1 on frequency F1 to node 202, and will transmit using a different code (A2) on frequency F1 to node 203. As indicated by ellipses 205, other nodes may also be included and, in such cases, different transmission codes would be used.

Figure 3:
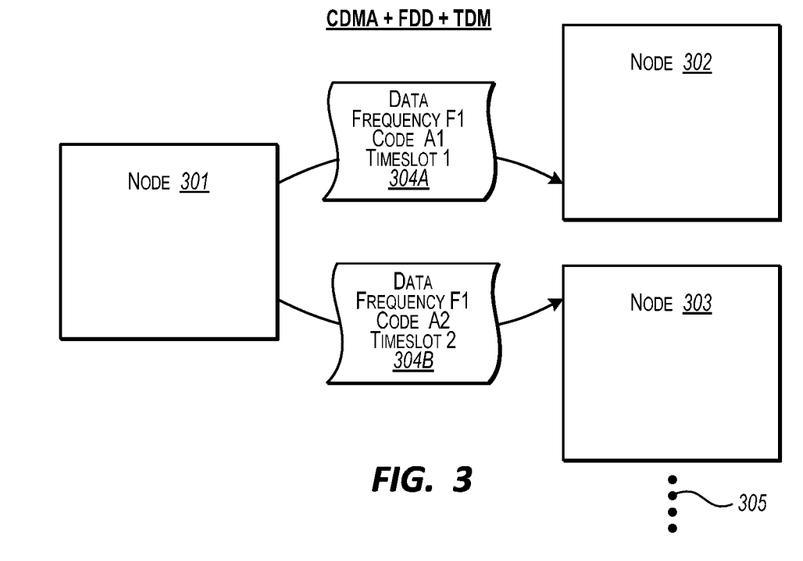
FIG. 3 illustrates an embodiment in which nodes in a mobile ad hoc network communicate using CDMA, FDD and TDM.

In FIG. 3, nodes 301, 302 and 303 communicate within an ad hoc network using CDMA, FDD and TDM simultaneously. Accordingly, in such an embodiment, node 301 would encode a communication using a code that was assigned for CDMA, would transmit over a frequency band that was assigned for FDD, and would transmit and receive to and from nodes 302 and 303 using assigned time segments and synchronized switches according to TDM. This allows for continuous transmissions between nodes 301, 302 and 303. Thus, node 301 may transmit message 304A to node 302 using frequency F1, code A1 and timeslot 1, and may transmit message 304B to node 303 using frequency F1, code A2 and timeslot 2. Ellipses 305 indicate that other nodes may also be included in the ad hoc network. Transmissions to those nodes would use the same frequency, but different codes and different time slots In traditional network environments, communications between nodes are carried out using data bursting techniques. These data bursts transmit data at a higher rate for a shorter amount of time, requiring more power and more robust antennas. Continuous transmission provided by the use of CDMA and FDD, or CDMA, FDD and TDM ensures better battery life, and longer range, even in a mobile ad hoc network. In at least some implementations of traditional ad hoc networks, only time division multiple access (TDMA) or time division duplexing (TDD) bursting transmission techniques are used.

The mobile ad hoc network (e.g. 100 of FIG. 1) may be self-forming and self-healing. The network 100 is self-forming in that nodes that come into contact with other nodes can communicate receive messages and be automatically joined to the network. The network 100 is self-healing in that, if a node leaves the network, or even if multiple nodes leave the network at substantially the same time, the remaining nodes in the mobile ad hoc network will maintain contact with each other and will maintain the network of nodes. Thus, nodes can enter and leave at will, with no single node being a point of failure in the network. The self-forming and self-healing nature of the network 100 allows continuous data transmission to continue with other network nodes upon the failure of one of the nodes.

For example, in FIG. 1, if node 101 is in continuous communication with node 102, and node 102 leaves the network, node 101 can begin or continue communication with node 103 or with another node. In the case of a cellular telephone, CDMA embodiments may be used where the cell phone connects to a cell tower using a DSSS encoded signal. That cell tower, however, is at a fixed location and may be the only tower in range of a given cell phone. Thus, in such cases, the cell tower becomes a single point of failure, and the cell phone needs to change locations to be in range of a working cell tower before it will have a cellular connection. No such single point of failure exists in mobile ad hoc networks.

When CDMA is used in a transmission, such as in FIGS. 1-3, the spectrum 107 is spread at a very high factor. Indeed, in some embodiments, the spectrum 107 may be spread by a factor of at least 1,000 times. Accordingly, bandwidth for the transmission would be at least 1,000 times greater than the transmission bit rate. As will be understood by one skilled in the art, bandwidth is proportional to (or is based on) the bit rate. CDMA is a spread spectrum technique where the spectrum 107 is spread out farther than the bandwidth that would normally be used with a given bit rate 106. The high processing gains seen in the spectrum spread allow for network nodes to tolerate reception of other nodes that exhibit a high power imbalance. Despite the power imbalance between nodes, communications can still be maintained in the network. Indeed, the high processing gain achieved by the embodiments herein allows CDMA to be used in a mobile ad-hoc mesh network, in conjunction with FDD and/or TDM.

As mentioned above, processing gain refers the ratio of the occupied bandwidth to the bit rate. The spectrum is then spread using the code in CDMA. Code rate sets the radio frequency (RF) bandwidth, and the higher the processing gain, the wider the bandwidth gets (e.g. by applying additional codes to the transmission). Processing gain is a measure of how much the bandwidth spreads over the actual data bits (i.e. the ratio of the code rate to the bit rate). In one case, for example, if a data rate of 1 Mbps was used and a code rate of 10 Mbps was used, then the processing gain would be 10, and there would be 10 coded chips per data bit.

In the embodiments herein, the spectrum 107 may be spread at a factor of at least 1,000 times or even 10,000 times, which is orders of magnitude greater than processing gains currently in use by existing CDMA-based networks. In such cases, bandwidth for the transmission would be at least 1,000-10,000 times greater than the transmission bit rate. The combination of CDMA, FDD and TDM in the mobile ad hoc network allows spreads of this magnitude, and allows signals transferred over such a spread to be received and interpreted by a receiving node.

Besides allowing for continuous, low-power transmissions between nodes, the embodiments herein provide a large processing gain which spreads the spectrum 107 of the transmission signal 105 and substantially decreases the likelihood of that signal being detected by other parties such as adversaries. Because the signal is transmitted at a much lower power, the signal 105 is harder to pick up using a signal detector. Indeed, large processing gain allows the signal to be received below the noise floor. This allows for lower power transmissions which makes the signal harder to detect. Furthermore, the large processing gain and spread spectrum decrease the likelihood of the transmission signal 105 being disrupted using a signal jammer. In such cases, a signal jammer would need to be much stronger to sufficiently block the signal from reaching another node in the network 100.

Another advantage of at least some embodiments is that CDMA and FDD transmissions allow for imbalance of transmission power among the nodes in the mobile ad hoc network 100. In traditional cellular systems, the cell tower tells each phone which power level to use during transmission. Ideally, each cell phone would be using the minimum amount possible so that the various phones' signals don't interfere, but in practice, phones that are farther from the cell tower use more transmission power, while closer phones use less power. In a mobile ad hoc network (Manet), however, each node (e.g. phone, wearable device, vehicle, aircraft, etc.) will use substantially the same broadcast power, whether the nodes are close together or far apart.

In some embodiments, communications transmitted between the network nodes (e.g. 101-103) are communicated asynchronously. In some cases, such as in FIG. 2 where CDMA and FDD are used to encode and transmit the transmission signals, it may be unnecessary to synchronize clocks and transmit and receive messages in a synchronous fashion. Each node may transmit at the same time or at different times, in an asynchronous manner.

In a traditional time division duplexing (TDD) scenario, if nodes are sharing a frequency over specified time intervals, and three nodes each need to transmit 1 Mb/s of data, then each transmits a 3 Mb/s burst (or higher, due to timing gaps between transmissions) during its time interval to make up for the time lost on the other two signals. This, as mentioned above, requires larger antennas and larger power amplifiers. In the embodiments herein, each of the three nodes could transmit at 1 Mb/s simultaneously, using CDMA and FDD, or CDMA, FDD and TDM. The transmissions could occur at a much lower power level, and would be less prone to interference (as described further below with reference to node 401 of FIG. 4). The large spread provided in the embodiments herein may implement advanced demodulation techniques and hardware receiver architectures to unspread the codes received from each of the nodes. These concepts will be explained further below with regard to methods 500 and 600 of FIGS. 5 and 6, respectively.

Figure 5:
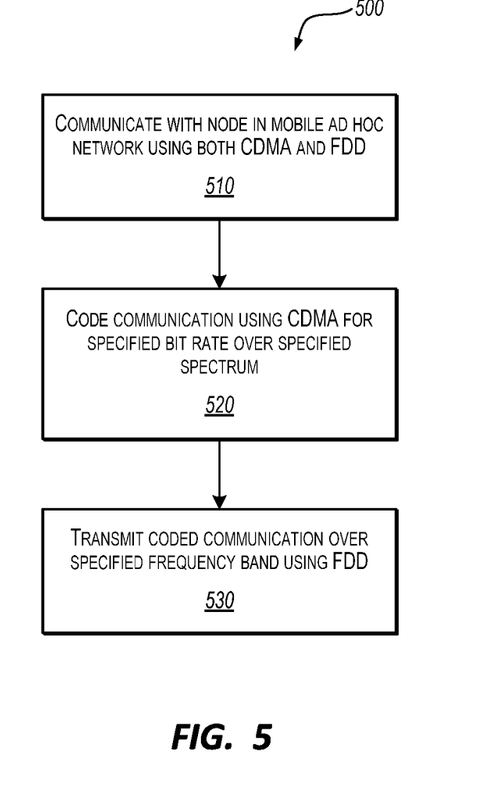
FIG. 5 illustrates a flowchart of an example method for communicating between nodes in a mobile ad hoc network.
Figure 6:
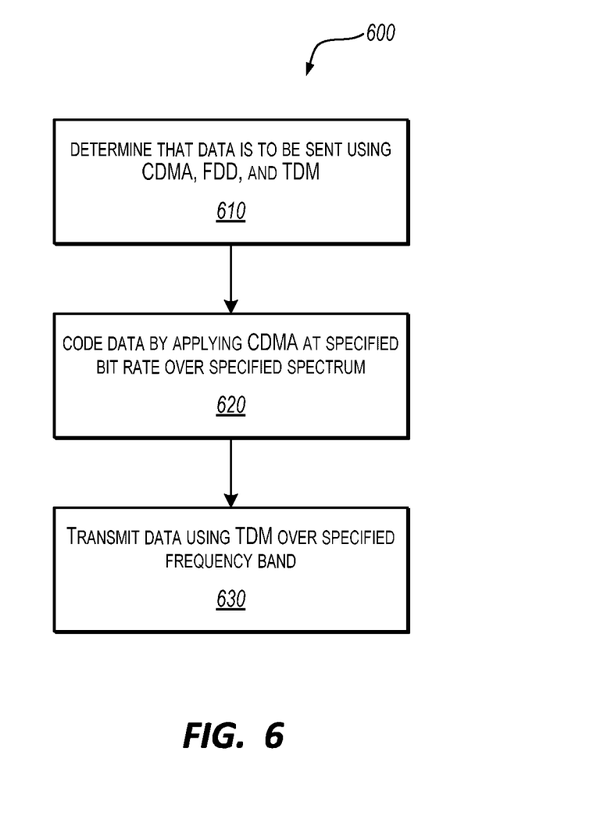
FIG. 6 illustrates a flowchart of an example method for communicating between nodes in a mobile ad hoc network that includes a plurality of nodes.

In view of the systems and architectures described above, methodologies that may be implemented in accordance with the disclosed subject matter will be better appreciated with reference to the flow charts of FIGS. 5 and 6. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 5 illustrates a flowchart of a method 500 for communicating between nodes in a mobile ad hoc network. The method 500 will now be described with frequent reference to the components and data of mobile ad hoc network 100, along with the embodiments shown in FIGS. 2-4.

Method 500 includes a first node in a mobile ad hoc network communicating with at least a second node in the mobile ad hoc network using both code division multiple access (CDMA) and frequency division duplexing (FDD) (510). For example, node 101 may communicate with node 102 in mobile ad hoc network 100 using both CDMA and FDD. Applying specific codes to the transmission signals 105 allows multiple nodes to transmit at the same time within the network. Each node then listens for specific codes in the transmission signals. The nodes also use specific frequency bands (e.g. 108) according to the frequency division duplexing scheme used. In this manner, node 101 uses CDMA module 111 and FDD module 112 to generate transmission signal 105 and send it to node 102 and potentially to other nodes such as node 103.

Method 500 next includes coding the communication on the first node prior to transmission to the second node, wherein the coding includes applying DSSS modulation to a transmission signal at a specified bit rate over a specified spectrum, the DSSS coding being applied in accordance with a processing gain which spreads the spectrum relative to the bit rate of the transmission (520). The communications module 104 of node 101 thus applies DSSS modulation to transmission signal 105 at a specified bit rate 106 (e.g. 1 Mb/s) over a specified spectrum 107. The DSSS coding is applied according to a processing gain which spreads the spectrum 107 relative to the bit rate 106 of the transmission. This spread allows the transmission signals to be sent at a continuous, low-power rate that is unlikely to interfere with other transmission signals in the mobile ad hoc network.

Method 500 also includes transmitting the coded communication over a specified frequency band allocated to the first node using FDD over which the first node transmits data and over which the second node receives the data (530). For example, node 101 may transmit the coded transmission signal 105 over frequency band 108 that was allocated to node 101 using FDD. Node 101 thus communicates with node 102 in the mobile ad hoc network using both CDMA and FDD. The communications are designed to be low-power, substantially continuous transmissions (as opposed to bursts) that operate over a highly spread spectrum 107.

Figure 4:
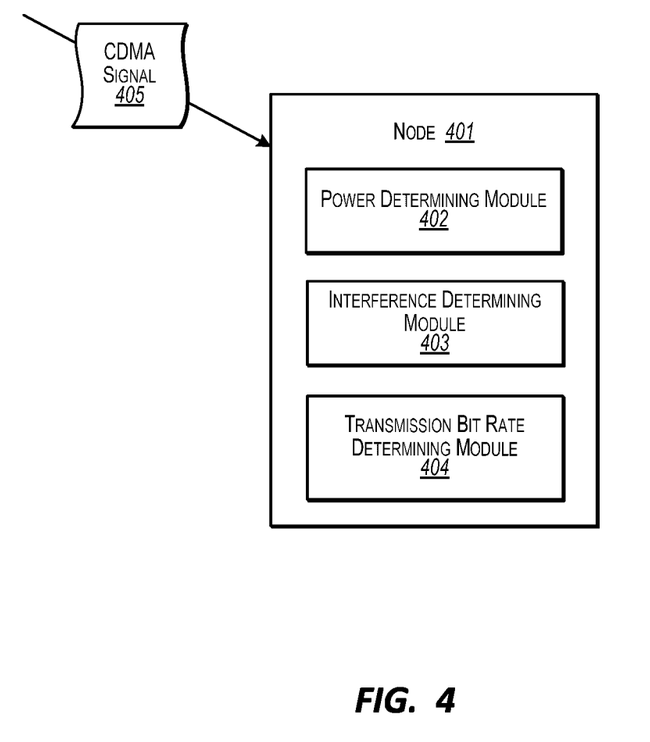
FIG. 4 illustrates an embodiment in which broadcast power levels and interference levels are determined at a node in a mobile ad hoc network

In one embodiment, as shown in relation to node 401 of FIG. 4, node 401 may receive a CDMA signal 405. Upon receiving that CDMA signal 405, the power determining module 402 may determine a broadcasting power level associated with the received CDMA signal 405. The broadcasting power level may indicate the amount of power used to transmit the CDMA signal or the amount of power contained in the CDMA signal when received at node 401. The interference determining module 403 may then determine whether the received CDMA signal will interfere with other nodes in the mobile ad hoc network.

If the power level is too high, for example, the signal will be more likely to interfere with other signals. Whereas on the other hand, if the power level is much lower, it will be less likely to interfere with other signals. Thus, the interference determining module 403 may determine and output an interference level that indicates the likelihood of that signal interfering with others in the mobile ad hoc network. The likelihood of interfering may be dependent on the mobile ad hoc network itself. Indeed, networks in some locations may be surrounded by interfering items or signals, or may be generally more prone to interference. Thus, the threshold for determining likelihood of interference may be lower in that network, as the chance of experiencing interference would be higher, regardless of the signal strength of the transmission signal.

The transmission bit rate determining module 404 may then use the likelihood of interference to determine a desired transmission bit rate power level for transmission to the sender of the CDMA signal. Thus, if node 401 wants to send a return message to the sender of the received CDMA signal 405, the transmission bit rate determining module 404 can determine the ideal power level for transmitting a message that is not likely to interfere with other signals in the network. The transmission bit rate determining module 404 may use the likelihood of interference calculation performed by the interference determining module 403 to gauge how high or low the transmission bit rate power level should be to ensure the signal is strong enough to reach the sender of the CDMA signal 405, but is not so strong that it interferes with other signals in the network. Node 401 may then transmit a CDMA signal to the sender and/or other nodes of the mobile ad hoc network using the determined transmission bit rate power level.

In some embodiments, the node 401 (or 101 of FIG. 1) may be configured to identify a center frequency for each FDD sub-band. In cases where FDD is used, and each node has an assigned frequency band (108), the node 101 may identify a center frequency for that assigned frequency band. This center frequency may then be used as the transmission frequency when transmitting signals between nodes using FDD. The node 101/401 may also be configured to identify or generate pseudo noise codes (PN codes) for each node. PN codes can be used to identify the nodes that generated the communication. For example, node 401 may generate a PN code based on pseudo random noise. The pseudo random noise is a statistically random signal similar to noise. This pseudo noise may be used to generate a PN code which can then be matched to a received signal within a spread-spectrum system. Matching PN codes can be used to identify the source of the message and act as an identifier for the message.

Turning now to FIG. 6, a flowchart is illustrated of a method 600 for communicating between nodes in a mobile ad hoc network that includes a plurality of nodes. The method 600 will now be described with frequent reference to the components and data of network 100.

Method 600 includes determining that one or more portions of data are to be part of a communication sent from a first node in the plurality of nodes to at least a second node in the plurality of nodes using code division multiple access (CDMA) frequency division duplexing (FDD), and time division multiplexing (TDM) (610). For example, node 101 may determine that data is to be sent from node 101 to node 102 and/or to other nodes in a mobile ad hoc network. The data is to be sent using CDMA, FDD and TDM. As such, each transmission signal 105 is transmitted with a specified code for CDMA, on a specified frequency for FDD, and at a specified time interval for TDM.

Indeed, method 600 includes coding the communication containing the data prior to transmission to the second node (620). The coding includes applying DSSS modulation to a transmission signal at a specified bit rate over a specified spectrum, the DSSS coding being applied in accordance with a processing gain which spreads the spectrum relative to the bit rate of the transmission (620). When DSSS modulation is applied to the transmission signal 105, that transmission signal is transmitted at a specified bit rate 106 over a specified spectrum 107 according to a performance gain that spreads the spectrum 107 relative to the bit rate of the transmission. Using the embodiments herein, the spectrum 107 may be spread by a factor of at least 1,000 times or even 10,000 times. As such, bandwidth for the transmission would be at least 1,000-10,000 times greater than the transmission bit rate 106. The combination of CDMA, FDD and TDM in the mobile ad hoc network 100 thus allows spreads of this magnitude, and allows signals transferred over such a spread to be received and interpreted by node 102.

Method 600 further includes transmitting the communication using time division multiplexing (TDM) over a specified frequency band allocated to the first node over which the first node transmits data and over which the second node and at least a third node receives the data (630). Once the DSSS coding has been applied, the transmission signal 105 is sent to node 102 on frequency band 108 according to FDD, and according to a timing sequence dictated by TDM. This combination of coding and transmission techniques, when applied in a mobile ad hoc network, allows for low-power, continuous transmissions between nodes. These transmissions are less prone to interference and signal jamming, and can be carried out using less power and cheaper components (e.g. antennas and power amplifiers).

Node 101 may receive asynchronous transmissions from other nodes in the mobile ad hoc network. In some cases, a group of nodes may be formed around node 101. This group of nodes is the N strongest neighbor nodes. This group may be formed by identifying the power level of the transmitted messages of the surrounding nodes (e.g. using the power determining module 402 of FIG. 4). Other nodes outside of this group may appear to node 101 as Gaussian noise. This group of nodes may be formed initially, and then may change over time as other nodes change positions relative to node 101. The position changes may result in certain nodes gaining or losing signal strength relative to node 101, thus including those nodes in the group or excluding them as mere noise. Groups may interchange messages as known entities, and may implement any of the duplexing, multiplexing or multiple access techniques available.

Accordingly, in this manner, systems and methods are provided which allow for communication between nodes in a mobile ad hoc network. Various combinations of transmission coding and timing or frequency division techniques may be used to provide a low-power, continuous transmission between the nodes. These transmissions may be less vulnerable to interference and jamming, and provide a reliable and consistent way to communicate within a mobile ad hoc network.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A system for communicating between nodes in a mobile ad hoc network, the system comprising:

a plurality of nodes in a mobile ad hoc network, wherein at least a first node in the plurality of nodes is configured to communicate with a second node in the plurality of nodes using both code division multiple access (CDMA) and frequency division duplexing (FDD);

wherein the communication is coded on the first node prior to transmission to the second node, the coding including applying direct sequence spread spectrum (DSSS) modulation to a transmission signal at a specified bit rate over a specified spectrum, the DSSS coding being applied in accordance with a processing gain which spreads the spectrum relative to the bit rate of the transmission, wherein the spectrum is spread at a factor of at least 1,000 times, such that bandwidth for the transmission is at least 1,000 times greater than the transmission bit rate; and wherein the coded communication is transmitted over a specified frequency band allocated to the first node over which the first node transmits data and over which the second node receives the data.

2. The system of claim 1, wherein the first node in the mobile ad hoc network additionally implements time division multiplexing (TDM) when transmitting the communication.

3. The system of claim 1, wherein CDMA, FDD and TDM are used simultaneously within the mobile ad hoc network to transmit the communication from the first node to the second node.

4. The system of claim 1, wherein the communication is part of a continuous transmission between the first node and the second node within the mobile ad hoc network.

5. The system of claim 4, wherein the mobile ad hoc network is self-forming and self-healing, allowing the continuous transmission to continue through rerouted network nodes upon the first or second node becoming unavailable.

6. The system of claim 1, wherein the spectrum is spread at a factor of at least 10,000 times, such that bandwidth for the transmission is at least 10,000 times greater than the transmission bit rate.

7. The system of claim 1, wherein the processing gain that spreads the spectrum decreases the likelihood of detection by adversaries, and further decreases the likelihood of signal disruption using a signal jammer.

8. The system of claim 1, wherein the CDMA and FDD transmission provides minimally-powered, continuous data communications.

9. The system of claim 8, wherein the CDMA and FDD transmission allows for imbalance of transmission power among the plurality of nodes in the mobile ad hoc network.

10. The system of claim 1, wherein communications transmitted between the first and second nodes are communicated asynchronously.

11. A method for communicating between nodes in a mobile ad hoc network, the method comprising:

a first node in a mobile ad hoc network communicating with a second node in the mobile ad hoc network using both code division multiple access (CDMA) and frequency division duplexing (FDD);

coding the communication on the first node prior to transmission to the second node, wherein the coding includes applying DSSS modulation to a transmission signal at a specified bit rate over a specified spectrum, the DSSS coding being applied in accordance with a processing gain which spreads the spectrum relative to the bit rate of the transmission;

transmitting the coded communication over a specified frequency band allocated to the first node using FDD over which the first node transmits data and over which the second node receives the data receiving, on a receiving band, a CDMA signal;

determining a broadcasting power level associated with the received CDMA signal; and determining whether the received CDMA signal will interfere with other nodes in the mobile ad hoc network.

12. The method of claim 11, further comprising determining a desired transmission bit rate power level for transmission to the sender of the CDMA signal.

13. The method of claim 11, further comprising transmitting a CDMA signal to one or more nodes of the mobile ad hoc network using the determined transmission bit rate power level.

14. The method of claim 11, further comprising identifying a center frequency for each FDD sub-band.

15. The method of claim 11, further comprising identifying one or more pseudo noise codes (PN codes) for each node.

16. A method for communicating between nodes in a mobile ad hoc network that includes a plurality of nodes, the method comprising:

determining that one or more portions of data are to be part of a communication sent from a first node in the plurality of nodes to a second node in the plurality of nodes using all of code division multiple access (CDMA), frequency division duplexing (FDD), and time division multiplexing (TDM);

based on the determination, coding the communication on the first node prior to transmission to the second node, the coding including applying DSSS modulation to a transmission signal at a specified bit rate over a specified spectrum, the DSSS coding being applied in accordance with a processing gain which spreads the spectrum relative to the bit rate of the transmission;

transmitting the communication using time division multiplexing (TDM) over a specified frequency band allocated to the first node over which the first node transmits data and over which the second node and at least a third node receives the data; and wherein the first node receives one or more asynchronous transmissions from other nodes in the plurality of nodes, the nodes comprising the N strongest neighbor nodes.

17. The method of claim 16, wherein other nodes in the network of nodes appear to the first node as Gaussian noise.

* * * * *